(12) United States Patent
Larsen et al.

(10) Patent No.: US 7,441,564 B2
(45) Date of Patent: Oct. 28, 2008

(54) GAS CYLINDER VALVE ASSEMBLY

(75) Inventors: Todd W. Larsen, Milaca, MN (US); Eric W. Neumann, Pinceton, MN (US)

(73) Assignee: Tescom Corporation, ELk River, MN (US)

( * ) Notice: Subject to any disclaimer, the term of this patent is extended or adjusted under 35 U.S.C. 154(b) by 359 days.

(21) Appl. No.: 11/146,373

(22) Filed: Jun. 6, 2005

(65) Prior Publication Data

US 2006/0272715 A1    Dec. 7, 2006

(51) Int. Cl.
*F16K 17/30* (2006.01)
(52) U.S. Cl. ................... 137/613; 137/505.25
(58) Field of Classification Search ................. 137/613, 137/505, 505.25, 594
See application file for complete search history.

(56) References Cited

U.S. PATENT DOCUMENTS 5,458,151 A    10/1995   Wass
6,041,762 A    3/2000    Sirosh et al.
6,691,729 B2 *  2/2004   Takeda et al. ............... 137/613

* cited by examiner

*Primary Examiner*—Kevin L Lee
(74) *Attorney, Agent, or Firm*—Marshall, Gerstein & Borun LLP

(57) ABSTRACT

The gas valve assembly includes a housing with a bore and a main valve body and a main valve stem mounted therein. The valve body has a fluid passage fluidly connecting the inlet and one of a housing and valve body outlet with the valve stem mounting a valve seat and being movable for blocking fluid flow through the passage. In two embodiments, the housing is threadable to the neck portion of a vessel for the inlet opening to the vessel interior and the main valve body mounts a manual operated shut off valve extending within the valve body to selectively block fluid flow through the passage and an excess flow valve to block fluid flow through the passage when the flow to the outlet is greater than desired. The last two mentioned valves include a common piston in the fluid passage.

18 Claims, 6 Drawing Sheets

US 7,441,564 B2

GAS CYLINDER VALVE ASSEMBLY

BACKGROUND OF THE INVENTION

This invention is for a valve assembly usable with cylinders or tanks or other type vessels containing gas under high pressure liquid or gaseous form.

U.S. Pat. No. 5,458,151 to Wass discloses a solenoid control valve mountable to the collar of a gas cylinder with the solenoid being in the interior of a cylinder for operating a valve for controlling the flow of pressurized gas from the cylinder. In U.S. Pat. No. 6,041,762 to Sirosh et al, there is disclosed controls for controlling the supply of gas from a gas vessel which includes a module having a pressure regulator in the interior of the vessel, pressure and temperature sensors, a pressure relief device, a solenoid valve and a check valve.

In order to provide an improved assembly for controlling the flow of pressurized fluid out of a container for pressurized fluid, this invention has been made. The gas cylinder valve assembly of this invention is mountable to the neck of a vessel containing pressurized gas or liquid and can be used, for example, for controlling the flow of fuel gas, including natural gas, to the engine of a motor vehicle, controlling the flow of gas to fuel cells, controlling the flow of gases such as oxygen, hydrogen, nitrogen for various industrial uses and controlling the flow of liquid for various industrial uses.

SUMMARY OF THE INVENTION

The gas cylinder valve assembly of two embodiments includes a valve housing or manifold threadedly mounted to the neck of a cylinder (vessel) for pressurized gas to extend into the interior of a cylinder and has an inlet opening to the cylinder interior and to a main valve bore (housing bore). A fitting (valve body) is threaded to the housing to extend into the housing bore. The valve body has a body bore that opens through the external end of the body and through a valving surface remote from the external end. A main valve stem mounts a valve seat that is seatable against the valuing surface and mounts an actuating mechanism for moving the main valve stem to a main valve open position. The body bore has an excess flow piston therein that is resiliently retained in an open position to permit fluid flowing therethrough to an outlet. One end portion of the body bore has a bonnet therein which mounts an excess flow valve member and a manual shut off valve that is manually operable for abutting against the excess flow piston to selectively block fluid flow from the inlet to the outlet. In one embodiment the main valve stem is movable by magnet mechanism to a main valve closed position while in a second embodiment a fluid pressure operated actuator moves the main valve stem to the main valve open position and in a third embodiment the housing is mounted between a source of fluid under high pressure and an apparatus to which the fluid is supplied with it including a main body portion extending into a valve seat the same as the other two embodiments.

An object of this invention is to provide a new and novel value assembly for controlling the flow of pressurized fluid from the interior of the cylinder (vessel) containing fluid under high pressure. In furtherance of the above object, it is another object of this invention to provide the valve assembly with the force acting on the stem based on the inlet pressure and is constant regardless of the outlet pressure. Another object of this invention is to provide new and novel valve apparatus that is not only operable for controlling the flow of pressurized fluid from the cylinder or tank but also to automatically block such flow in the event there is excess flow through the valve assembly outlet.

DESCRIPTION OF THE PREFERRED EMBODIMENTS

Figure 1:
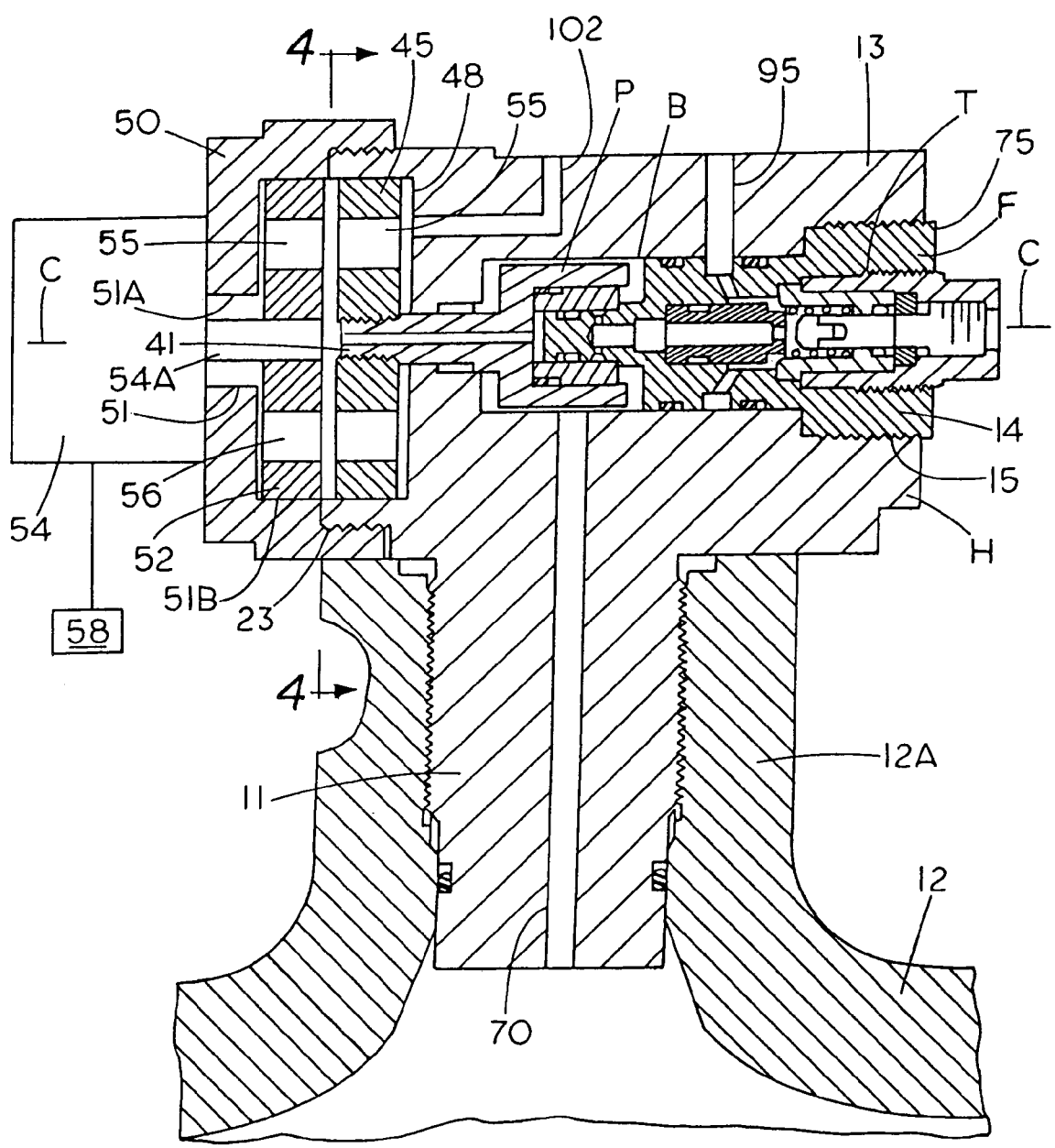
FIG. 1 is a longitudinal cross sectional view of the first embodiment of gas cylinder valve assembly of the first embodiment of the invention with only part of the gas cylinder being shown; said view being generally taken along the line and in the direction of the arrows 1-1 of FIG. 4.
Figure 2:
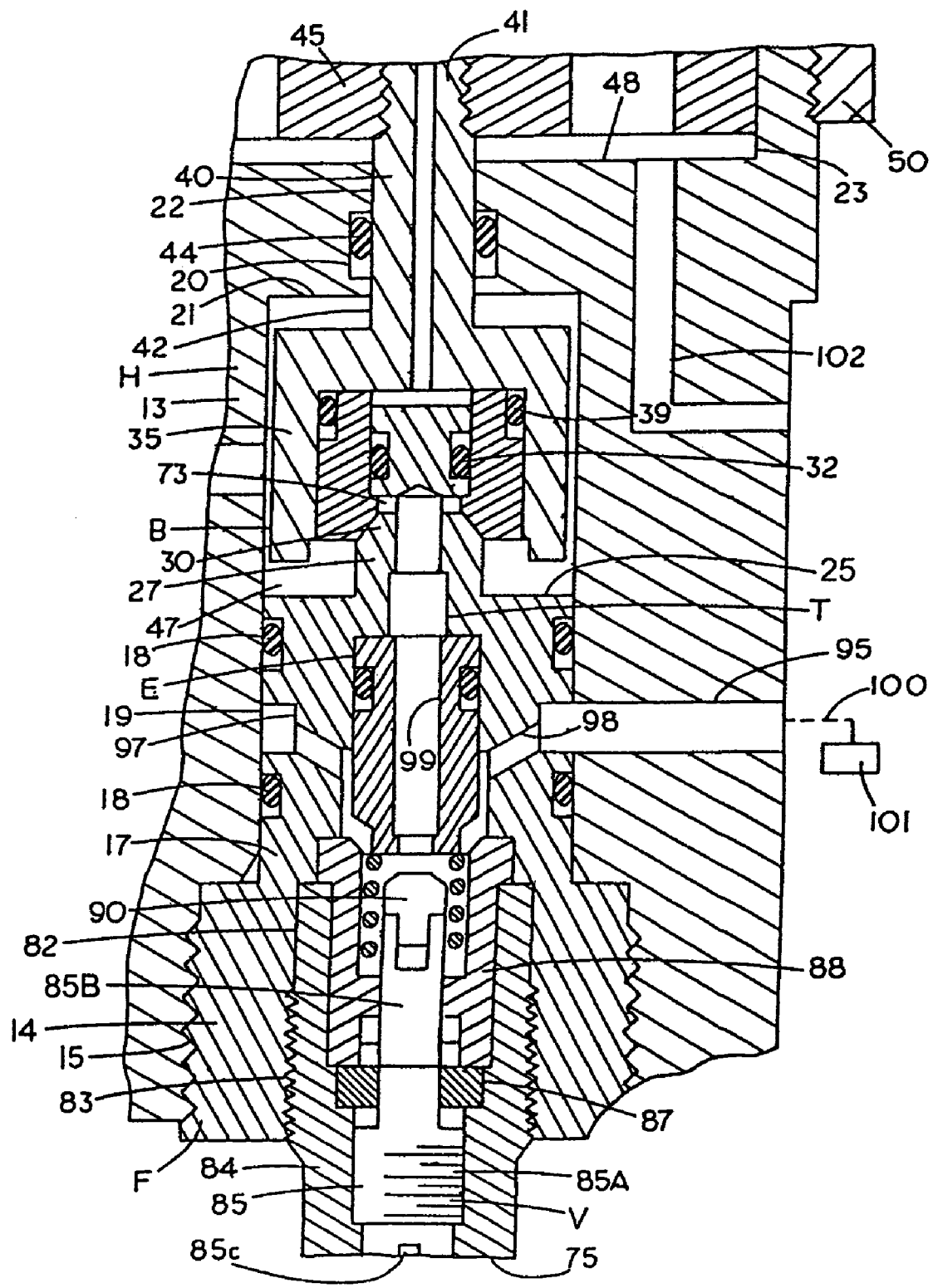
FIG. 2 is an enlarged showing of a fragmentary portion of the apparatus shown in FIG. 1.
Figure 3:
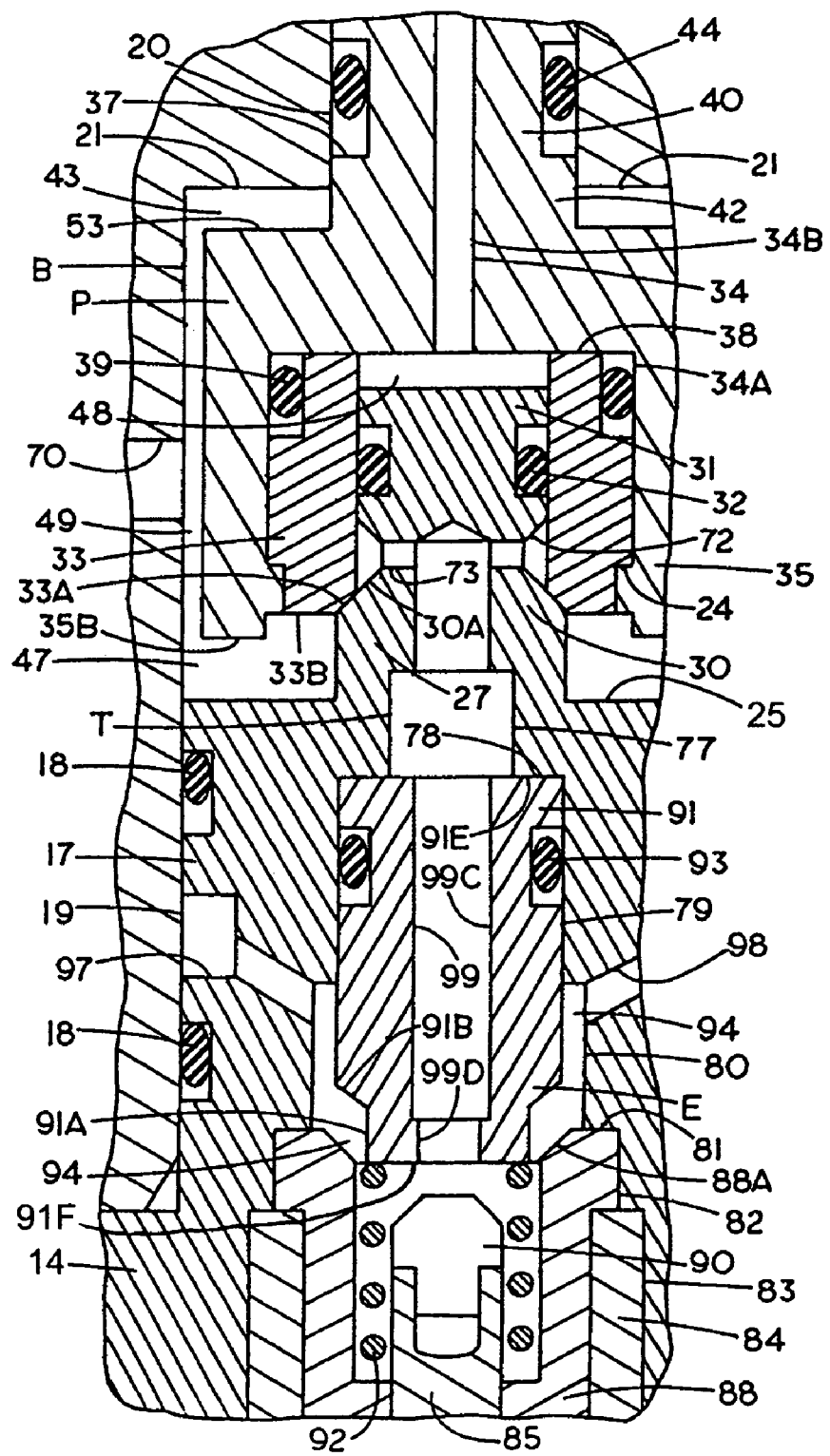
FIG. 3 is a further enlarged showing of a fragmentary portion of the apparatus of FIG. 1.

Referring to FIGS. 1-4 of the drawings, the gas cylinder valve assembly of the first embodiment of this invention includes a housing H having a lower, externally threaded portion 11 that is threadable to the internal portion of a neck 12A of a cylinder (tank or vessel) 12 to extend therein. The housing has a portion 13 external of the cylinder and has an axially elongated main bore B extending transversely therethrough, the central axis of the bore being designated C-C. The main bore has a fitting (valve body) F mounted therein which has a fitting threaded portion 14 threaded to a threaded bore portion 15 of the axially elongated main bore B.

Joined to the fitting threaded portion 14 is an axially intermediate portion 17 that is of a smaller diameter than the fitting threaded portion 14 and mounts axially spaced fluid seal members 18 forming a fluid seal between the fitting and the radial adjacent parts of a main bore portion 19 which is of a smaller diameter than the threaded bore portion 15. The bore portion 19 at its axial opposite end opens to a reduced diameter bore portion 20 to provide an annular shoulder 21. The reduced diameter bore portion 20 in turn opens to a further reduced diameter bore portion 22 which in turn opens to an enlarged diametric bore portion 23 that opens through the housing surface opposite the threaded bore portion 15.

The valve body has a cylindrical portion 27 joined to the axially intermediate portion 17 axially opposite the fitting threaded portion 14 to provide a cylindrical shoulder 25, the cylindrical portion 27 being of a substantially smaller diameter than each of the main bore portion 19 and the axially intermediate portion 17. Integrally joined to the opposite axial end of the cylindrical portion 27 is the major base of a frustoconical portion (valve element) 30 while the motor base is joined to a cylindrical end portion 31. The valve element 30 includes a valving surface 30A. A cylindrical end fluid seal 32 is mounted to the cylindrical end portion 31 which extends into and is in fluid sealing relationship with an annular valve seat 33.

The annular valve seat 33, which may be made of plastic, is of a constant inner diameter except at the juncture to the minor base of a frustoconical (valve element) tapered surface 33A. The annular valve seat 33 is mounted, for example press fitted, in an enlarged diameter bore portion 34A of a valve stem bore 34, the valve stem bore 34 extending axially through a main valve stem P. The valve step bore 34 includes a reduced diameter bore portion 34B to vent the space between a stem shoulder 38 and the cylindrical end portion 31. Instead of having threads, the enlarged diameter bore portion 34A and the annular valve seat 33 are provided with oppositely facing shoulders 24 that retain the annular valve seat 33 in the enlarged diametric bore portion 34A. The enlarged diametric bore portion 34A is provided in an enlarged diametric portion 35 of the main valve stem P. The reduced diameter bore portion 34B opens to the axial end of the main valve stem P axially opposite the enlarged diametric portion 35 and to the enlarged diametric bore portion 34A to provide the stem shoulder 38 against which the annular valve seat 33 abuts. The reduced diameter bore portion 34B opens through the end of the main valve stem P that is axially opposite the valve body F. A fluid seal (O-ring) 39 is mounted by the annular valve seat 33 adjacent to the stem shoulder 38 to form a fluid seal between the outer periphery of the annular valve seat 33 and the inner peripheral wall that forms the enlarged diametric bore portion 34A.

The valve stem includes a reduced diameter, cylindrical portion 40 axially between and joined to a threaded terminal end portion 41 and a larger diameter portion 42 which in turn is joined to the enlarged diametric portion 35. The junction of the reduced diameter cylindrical portion 40 and the larger diameter portion 42 provide a stem bore shoulder 37. A second fluid seal (O-ring) 44 is mounted on the reduced diameter cylindrical portion 40 to form a fluid seal between the reduced diameter cylindrical portion 40 and the reduced diameter portion 20.

A first disk 45 is threaded to the threaded terminal end portion 41 and is located in the enlarged diametric bore portion 23 for axial reciprocal movement to reciprocally move the main valve stem P and is prevented from rotating, for example by a key 45A mounted to the housing H. The main valve stem P is of an axial length that when the main valve is in a closed position, the valve element tapered surface 33A abuts against the valving surface 30A of the valve element 30 to block fluid flow through the main valve, an annular terminal edge 33B of the annular valve seat 33 and enlarged diametric terminal edge 35B are axially spaced from the cylindrical shoulder 25 to provide a fluid chamber 47 while the first disk 45 is axially spaced from a shoulder 48 formed by the juncture of the reduced diameter portion 22, the enlarged diametric bore portion 23 and the enlarged diametric shoulder 53 of the enlarged diametric portion 35 at the juncture of the enlarged diametric portion 35 and the larger diameter portion 42 are axially spaced from the annular shoulder 21 to permit the valve stem moving to a valve open position.

Figure 4:
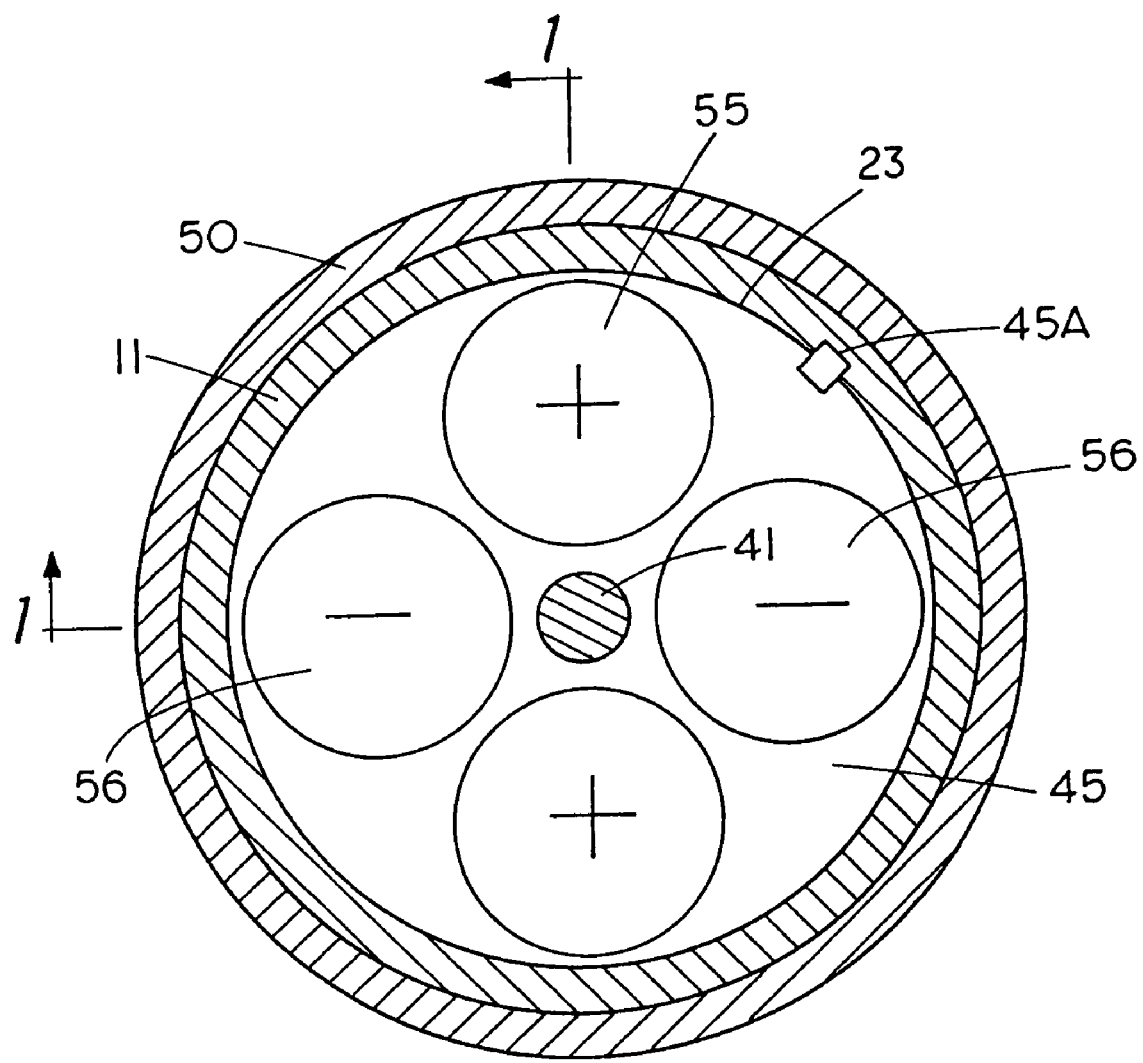
FIG. 4 is a fragmentary cross section that is taken along the line and in the direction of the arrows 4-4 of FIG. 1.

A cap (bonnet) 50 is threaded to the housing to close the enlarged diametric bore portion 23 and has an axial bore 51 extending therethrough with an enlarged axial bore portion 51B opening to the enlarged diametric bore portion 23 to provide an actuator chamber in which a second disk 52 is mounted for rotation. A shaft 54A of a rotary solenoid 54 extends through the reduced diameter shaft bore portion 51A of the cap 50 and mounts the second disk 52 for rotation therewith, the rotary solenoid 54 being mounted to the cap 50. Suitable controls 58 are provided for energizing and deenergizing the rotary solenoid 54 in accordance with the demands of a conventional apparatus 101 to which pressurized gas is to be supplied The first disk 45 and the second disk 52 each mount first permanent magnets 55 and second permanent magnets 56 which respectively are of opposite polarities with the first permanent magnets 55 and the second permanent magnets 56 being the same radial spacing from the axis of rotation of the shaft 54A and the same angular spacing from the angularity adjacent magnet that is of the opposite polarity. The axis of rotation of the shaft 54A is coextensive with the central axis C-C of the axially elongated main bore B. In one rotary position of the shaft 54A, the second permanent magnets 56 on disk 52 are axially aligned with the first permanent magnets 55 of the same polarity on the first disk 45 to be repelled by the second permanent magnets 56 on the second disk 52 whereby the main valve stem P is moved to or remains in a valve closed position and when the rotary solenoid 54 is actuated, the second disk 52 is rotated to a second position that the polarity of the second permanent magnets 56 are aligned with magnets of opposite polarity on the reciprocal disk whereby the first disk 45 is axially movable toward the second disk 52 for moving the main valve stem to the main valve open position. When the main valve is in the main valve open position, the rotary solenoid 54 may be actuated to rotate the second disk 52 sufficiently that the second permanent magnets 56 of one polarity on the second disk 52 are axially aligned with the first permanent magnets of the same polarity on the first disk 45 for closing the main valve. Although in FIG. 4, the first disk 45 is shown mounting four permanent magnets with the magnet of one polarity being angularly offset from magnets of the opposite polarity, each disk may mount more or fewer magnets, depending the degree the second disk 52 is to be rotated whereby the main valve stem P moves between the valve open and the valve closed positions. With four magnets such as shown in FIG. 4, the shaft 54A is rotated on 90 degrees for moving the main valve stem P between the valve open and valve closed positions. A vent passage 102 opens to the enlarged diametric bore portion 23 and to the ambient atmosphere.

The outer periphery of the enlarged diametric portion 35 is of a sufficiently smaller outer diameter than the diameter of the housing wall portion defining the main bore portion 19 to provide an annular clearance space 49 that is in constant fluid communication with the fluid chamber 47 and a clearance space 43 that is axially between the annular shoulder 21 and the enlarged diametric shoulder 53. The housing H has a fluid passage (inlet) 70 that opens to a cylinder interior when mounted on the cylinder 12 and to the annular clearance space 49 axially intermediate the enlarged diametric shoulder 53 and the enlarged diametric terminal edge 35B of the enlarged diametric portion 35. Thus, the stem bore shoulder 37 and the enlarged diametric shoulder 53 are axially opposite the enlarged diametric portion 35 from its enlarged diametric terminal edge 35B face in the axial opposite direction and are always subject to the inlet pressure acting to move the main valve stem P to the main valve closed position and acting on the enlarged diameter terminal edge 35B and the annular terminal edge 33B of the annular valve seat 33 to move the main valve stem P to the valve open position. Since the outer peripheral surface of the reduced diameter cylindrical portion 40 is a little less than the minimum inner diameter of the annular valve seat 33, the main valve stem P is always urged by the inlet pressure to the valve closed position. As a result, the force required to move the main valve stem P to the valve open position is many times less than the inlet fluid pressure.

The cylindrical end portion 31 of main valve body F has a radial outer annular groove 72 that in the valve closed position with the valve element tapered surface 33A abutting against the valving surface 30A opens radially just to the inner peripheral cylindrical surface of the annular valve seat 33 and through cross bores 73 to an axially elongated valve body bore T which at its axial opposite end opens through a main body exterior end surface 75 that is axially opposite the cylindrical end portion 31. The radial outer annular groove 72 is axially intermediate the annular terminal edge 33B of the annular valve seat 33 and the main body exterior end surface 75, the axially elongated valve body bore including a body bore portion 77 that opens to a larger diameter body bore portion 79 to provide a body bore annular shoulder 78 that faces the main body exterior end surface 75. The larger diameter body bore portion 79 in turn opens to a still larger diameter body bore portion 80 which in turn opens to a further larger diameter bore portion 82 to provide a body bore end annular shoulder-81. The further larger diameter bore portion 82 opens to a bonnet body bore portion 83 which in part is threaded to have a bonnet 84 threaded therein.

The bonnet 84 mounts a shut off valve threaded end portion 85A of a manual shut off valve stem 85 of a manual shut off valve V while a reduced diameter shut off valve stem portion 85B of the valve stem extends axially through a retainer washer 87 and into an annular valve member 88 of an excess flow valve E. The outer end of the manual shut off valve stem 85 may be provided with a screw driver slot 85c or a key way (not shown) or extend outwardly beyond the main body exterior end surface 75 to have a handle (not shown) mounted thereon to facilitate manually turning the manual shut off valve stem 85 between a shut off valve open position and a shut off valve closed position. The reduced diameter shut off valve stem portion 85B which is joined to the shut off valve threaded end portion 85A mounts a shut off valve seat 90 that in a shut off valve closed position abuts against the axially adjacent annular end of an axially elongated annular piston 91 to block fluid flow through the axially elongated annular piston 91 to an annular outlet clearance space 94.

The annular valve member 88 at one end abuts against the retainer washer 87, at the axial opposite end abuts against the body bore end shoulder 81 and extends within the bonnet 84. The annular valve member 88 has a radial inner, tapered surface 88A providing a valving surface. The axially elongated annular piston 91 extends within the larger diameter body bore portion 79—and the still larger diameter body bore portion 80 which, in an excess flow open position, at one end a piston surface 91E abuts against the body bore annular shoulder 78 and at the opposite end a piston terminal end 91F abuts against a spring 92 which resiliently urges the piston to an excess flow valve open position. The spring 92 extends within the annular valve member 88 and mounted thereby. The axially elongated annular piston mounts a piston fluid seal 93 to provide a fluid seal with the larger diameter body bore portion 79.

The outer peripheral surface of the piston and the still larger diameter body bore portion 80 provide the annular outlet clearance space 94 that opens to the radial inner tapered surface 88A of the valve member 88. The housing H has an outlet 95 which opens to an annular groove 97 in the valve body F which through outlet cross bores 98 fluidly connects the annular groove 90 to the annular clearance space 94. The outlet 95 is connectable by a line 100 to the conventional apparatus 101 to which fluid from the cylinder 12 is to be supplied. An excess flow valve E which blocks fluid flow from the inlet 70 and through the assembly passage to the outlet 95 when there is excess flow through the outlet 95 includes at least parts of the axially elongated annular piston 91 and the annular valve member 88, for example if there is a break in the line 100 or a problem with the conventional apparatus 101 leaking fluid at an excessive rate while the piston annular terminal end 91F and the shut off valve seat 90 which is seatable thereagainst forms part of the manual shut off valve V.

The piston has a piston bore 99 extending axially there through to, at one end, open to body bore portion 77 and at the opposite end open to the interior of the annular valve member 88. The piston has a reduced outer diameter end portion 91A that is of a smaller outer diameter than the inner diameter of the annular valve member 88 to extend or be extendable therein. The reduced outer diameter end portion 91A is joined by a shoulder to the minor base of a piston frustoconical (valve element) portion 91B which is abuttable against the radial inner tapered surface 88A of the annular valve member 88 to block fluid flow from the piston bore 99 to the annular outlet clearance space 94. The inner diameter of an orifice 99A at the end portion 91A of the piston bore 99 that is adjacent to the annular valve member 88 is less than that of an axially elongated piston bore portion 99C which opens to the body bore portion 77.

When the main valve is in an open position, the spring 92 provides sufficient spring force that the piston is retained in abutting relationship to the body bore annular shoulder 78. However, if there is a break in the line 100 or a problem develops in the conventional apparatus 101 so that there is an excess fluid flow, the fluid flowing through the orifice 99D develops a sufficiently great pressure drop that the spring force is overcome whereby the axially elongated annular piston 91 moves away from the body bore annular shoulder 78 to have a piston tapered shoulder 91B abut against radial inner tapered surface 88A to block fluid flow from the inlet 70 to the outlet 95. With the axially elongated annular piston 91 moving away from the body bore annular shoulder, fluid pressure acting between the piston surface 91E and the body bore annular shoulder 78 retains the axially elongated annular piston 91 in an excess flow valve closed position until either fluid under sufficient pressure is applied at the outlet 95 or the manual shut off valve V is operated to a closed position to push the axially elongated annular piston 91 to its excess flow valve open position whereby the spring 92 again retains the axially elongated annular piston 91 in its valve open position. While applying fluid pressure at the outlet 95 to move the axially elongated annular piston 91 to a valve open position, the taper of the piston valve element portion 91B and the radial inner tapered surface 88A are at different angles whereby a sufficient area of the piston valve element portion 91B in the excess flow valve closed position is exposed to pressure applied to the outlet 95 will move the piston to an excess flow valve open position. The excess flow valve provides an automatically operated safety feature to prevent undesirable escape of the pressurized fluid into areas where it is not desired.

When the main valve is in a closed position and the excess flow valve and the manually operated valves are in their open positions, the main valve blocks fluid flow through the fluid flow path from the cylinder 12 through the inlet 70, the clearance space 49, the fluid chamber 47, to the radial outer annular groove 72 and the cross bores 73 to the axially elongated valve body bore T and through the axially elongated annular piston 91 to the annular outlet clearance space 94 and the outlet cross bores 98 to the outlet 95. Since in the valve closed position, the cross bores 73 open to the cylindrical inner peripheral wall of the annular valve seat 33, the outlet pressure does not provide a force acting to move the main valve stem P to a valve open position.

Figure 5:
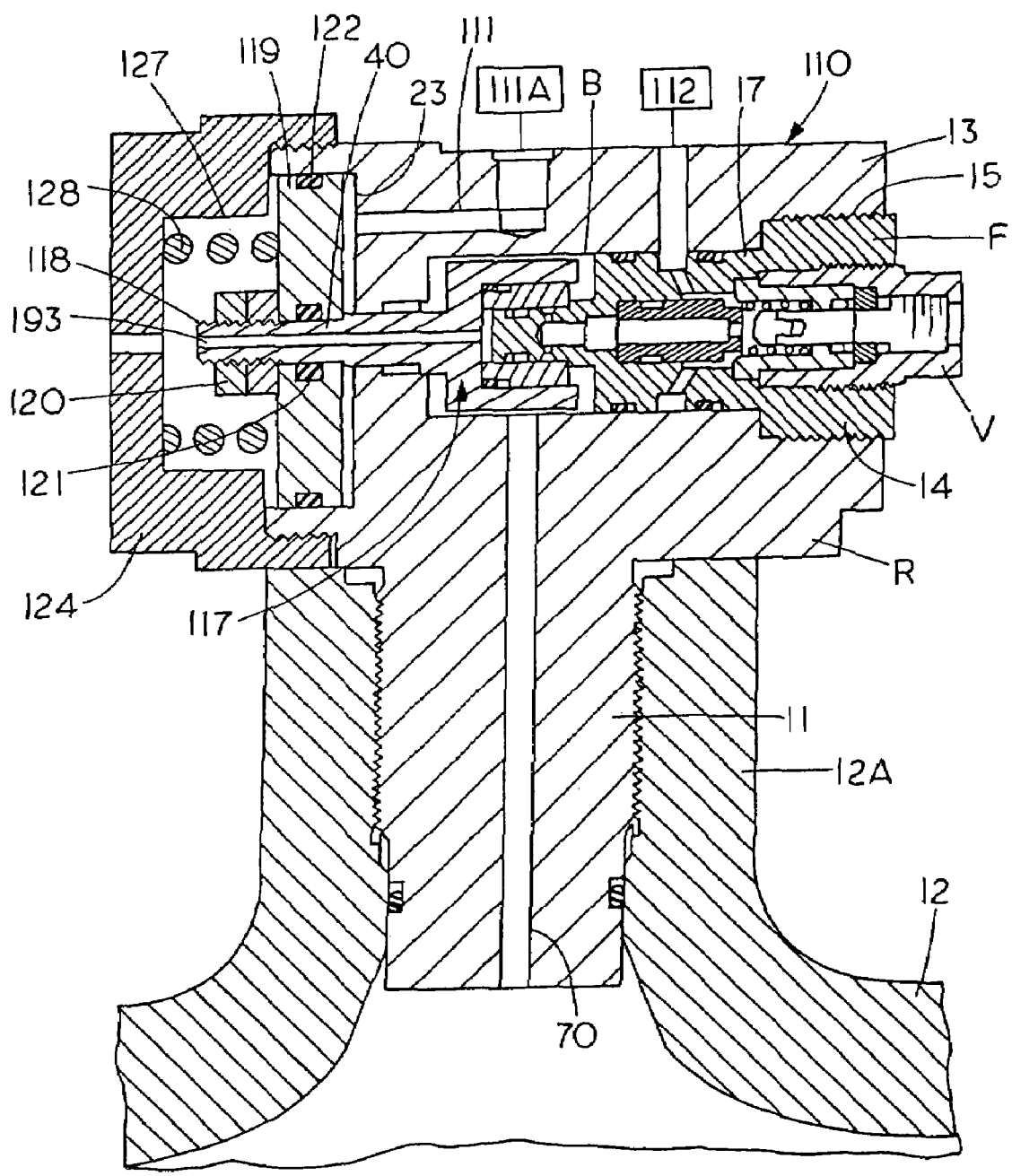
FIG. 5 is a longitudinal cross sectional view of the second embodiment of the invention.

Referring to FIG. 5, the second embodiment of the invention, generally designated 110, is the same as the first embodiment other for the differences set forth herein. The second embodiment includes a second housing R that is the same as the housing H except that instead of a vent passage 102 opening to the enlarged diametric bore portion 23, the second housing R has a pressurized fluid passage 111 that opens to the enlarged diametric bore portion 23 for selectively applying a pressurized fluid, for example air, from a pressurized fluid source 111A. Further the second embodiment includes a valve body F, the manual shut off valve V and an excess flow valve E that is the same as the corresponding members of the first embodiment. A second main valve stem 117, of the second embodiment are the same as the first embodiment other than a valve stem extended threaded end portion 118 which is joined to the reduced diameter cylindrical portion 40. The second main valve stem 117 has a vent passage that functions the same as passage 34A. Instead of providing magnet mounting disks, an actuating piston 119 is mounted to the valve stem extended threaded end portion 118 to abut against a shoulder formed at the juncture of the valve stem extended threaded end portion 118 and the reduced diameter cylindrical portion 40 while retainer nuts 120 are mounted on the valve stem extended threaded end portion 118 to abut against the actuating piston 119. The actuating piston 119 has a radial inner groove mounting a fluid seal 121 in fluid sealing relationship with the valve stem extended threaded end portion 118 and a radial outer annular groove mounting a fluid seal 122 in fluid sealing relationship with the inner peripheral wall of the enlarged diametric bore portion 23. A second cap 124 is threaded to the part of the second housing R having the enlarged diametric bore portion 23 to close the enlarged diametric bore portion 23 and has a cap bore 127 extending axially therethrough.

A cap spring 128 is mounted in the cap bore 120 to abut against a cap shoulder and the actuating piston 119 to constantly resiliently urge to the actuating piston 119 to move the second main valve stem 117 to its main valve closed position. When air under pressure is applied to the pressurized fluid passage 111 from the pressurized fluid source 111A, the actuating piston 119 is moved from the valve closed position to the valve open position. It is noted that the pressure required to move the actuating piston 119 from the valve closed position to valve open position is many times lower than the pressure applied from the cylinder 12.

Figure 6:
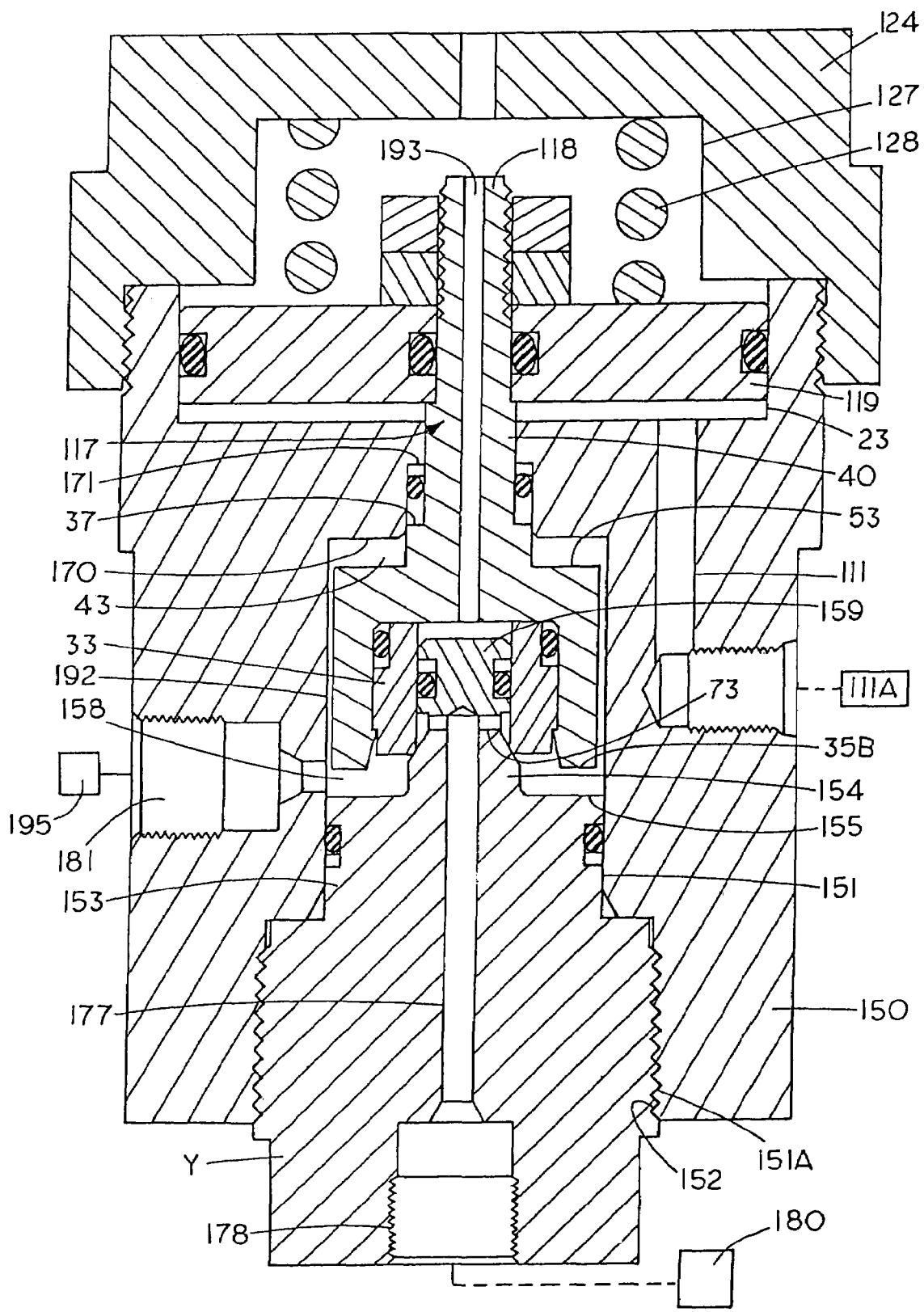
FIG. 6 is a longitudinal cross sectional view of the third embodiment

Referring to FIG. 6, the third embodiment has a third housing 150 having a third housing bore 151 extending axially therethrough, the housing bore 151 having a first end portion and a second cap 124 closing the first end portion that is the same as that of the second embodiment. Further the second main valve stem 117 the annular valve seat 33 mounted by the valve stem 117 and the actuating piston 119 for moving the valve stem is the same as that of the second embodiment. The third housing bore 151 has a second threaded bore portion 151A that is threaded to have a valve body Y extend therein and has a second fitting threaded portion 152 threaded to the second threaded bore portion 151A. The valve body Y includes a second axially intermediate portion 153 joined to the second fitting thread portion 152 and is joined to a second cylindrical portion 154 to provide a second cylindrical shoulder 155 axially spaced from the enlarged diametric terminal edge 35B and the annular terminal edge 33B to provide a second fluid chamber 158. The valve body Y includes a second cylindrical end portion 159 axially opposite the second fitting threaded portion that is the same as the cylindrical portion 31 of the first embodiment and extends within the annular valve seat 33 in the same way.

The stem of the third embodiment has the enlarged diametric shoulder 53 and the stem bore shoulder 37 facing the second annular shoulder 170 and the second stem bore 171 that are the same as the stem bore shoulder 37 and the annular shoulder 21 with the second shoulder 170 and the enlarged diametric shoulder 53 providing the clearance space 43 while the outer diameter of the enlarged diametric portion 35 in combination with the body wall forming the body cylindrical bore provides a second annular clearance space 192 that opens to a second inlet 181 and to a second fluid chamber 158 and the clearance space 43 and the stem shoulder 37 in both of the valve open position and the valve closed position. The second inlet 181 is fluidly connected to a second vessel 195 containing fluid under high pressure. The stem mounts an actuating piston 119 with a cap spring 128 abutting against the actuating piston 119 and the second cap 124 that are the same as the corresponding members of the second embodiment and a second valve stem bore 193 that is the same as that of the second embodiment.

The valve body Y has an annular groove that opens radial to the valve element tapered surface 33A of the annular valve seat 33 with cross bores 73 opening thereto and to a second axially elongated valve body bore 177 in the same manner as that of the first embodiment. The second axially elongated valve body bore 177 opens to a second outlet 178 that opens outward of the body threaded portion which is fluidly connected to a second conventional apparatus 180 to which fluid is to be supplied.

What is claimed is:

1. A valve assembly for controlling the flow of fluid from a source under high pressure, comprising:

a housing having an inlet for fluid from the source and a housing bore having a central axis extending axially through the housing that opens to the inlet;

a valve stem mounted to the housing and extending within the housing bore, the valve stem having an enlarged diametric portion that has an enlarged diametric terminal edge disposed within the housing bore and an axial stem bore opening through the enlarged diametric terminal edge;

an annular valve seat mounted in the axial stem bore and having an annular terminal edge and a cylindrical inner peripheral surface;

an axial extending main valve body mounted in the housing bore, at least one of the housing and the axial extending main valve body having a fluid outlet;

the axial extending main valve body having a first reduced diameter first edge portion extending within the annular valve seat;

a valving surface portion formed with the first reduced diameter first edge portion;

a terminal second edge portion axially remote from the first reduced diameter first edge portion and;

a fluid passage opening through the first reduced diameter first edge portion to the cylindrical inner peripheral surface and to the fluid outlet;

the axial extending main valve body having a cylindrical portion in fluid sealing relationship with the housing and having a valve body shoulder facing the annular terminal edge and the enlarged diametric terminal edge to provide an annular chamber that opens to the inlet;

the valve stem being axially movable between a valve closed position at which the annular valve seat blocks fluid flow from the annular chamber to the fluid passage and a valve open position permitting fluid flow from the annular chamber to the fluid passage;

the valve stem having at least one annular shoulder facing axial opposite the annular terminal edge and the enlarged diametric terminal edge in fluid communication with the inlet and of an area slightly greater than the annular terminal edge and the enlarged diametric terminal edge whereby the inlet pressure is in fluid communication with the at least one annular shoulder and the annular terminal edge and the enlarged diametric terminal edge to constantly urge the valve stem to move to the valve closed position;

and an actuator for selectively moving the valve stem to the valve open position.

2. The valve assembly of claim 1 wherein the housing has an end portion axially opposite the axial extending main valve body with the housing bore opening through the housing, the valve stem has a second terminal end axially opposite the enlarged diametric portion, and the actuator includes a piston mounted to the second terminal end movable by fluid pressure to move the valve stem to the valve open position.

3. The valve assembly of claim 1 wherein the housing has an end portion axially opposite the axial extending main valve body with the housing bore opening through the housing, a cap mounted to the end portion with the axial stem bore opening to the cap, the valve stem has a second terminal end axially opposite the enlarged diametric portion, and the actuator includes a first disk mounted to the valve stem for only axial movement to move the valve stem between the valve open position and the valve closed position, a second disk mounted within one of the cap and housing bores for rotary movement and a rotary solenoid connected to the second disk for selectively rotating the second disk, each of the first disk and the second disk mounting permanent magnets of opposite polarities with the second disk in a first rotated position having the permanent magnets on the second disk axially aligned with polarities opposite those of the magnets on the first disk to move the valve stem to the valve open position and in a second rotated position, having the permanent magnets on the second disk axially aligned with magnets on the first disk of the same polarity for moving the valve stem to the valve closed position and the rotary solenoid for rotating the second disk.

4. The valve assembly of claim 1 wherein the valve stem in both the valve open position and the valve closed position has the enlarged diametric terminal edge and the annular terminal edge axially spaced from the valve body shoulder to provide the annular chamber, the enlarged diametric portion has a radial outer cylindrical surface, the housing bore has a cylindrical bore portion including the enlarged diametric portion extending in the cylindrical bore and of a larger diameter than the radial outer cylindrical surface to provide an annular clearance space that in both the valve open position and the valve closed position opens to said annular chamber and is in fluid communication with the at least one annular shoulder and opens to the inlet.

5. The valve assembly of claim 4 wherein the valve stem has a first reduced diameter portion formed with the enlarged diametric portion opposite the enlarged diametric terminal edge and a second further reduced diameter portion formed with the first reduced diameter portion axially opposite the enlarged diametric portion to provide a stem bore shoulder, the second further reduced diametric portion being in fluid sealing relationship with the housing bore axially opposite the first reduced diameter portion from the enlarged diametric portion and the axial extending main valve body has a portion in fluid sealing relationship with the housing bore axially opposite the annular chamber from the annular valve seat.

6. The valve assembly of claim 1 being mountable to a vessel having an interior for containing a fluid under high pressure wherein the housing has a portion mountable to the vessel with the inlet opening to the interior and an excess flow valve mounted to the axial extending main valve body in the fluid passage between a valve body first end portion and the fluid outlet for automatically blocking fluid flow through the fluid passage in the event the flow rate is above a preselected value.

7. The valve assembly of claim 6 wherein the excess flow valve includes an annular piston that provides part of the fluid passage and is axially movable in the axial extending main valve body for having fluid flow through the fluid passage and a manually operated shut off valve is mounted to the axial extending main valve body that is selectively manually operable to, in cooperation with the annular piston, block fluid flow through the fluid passage.

8. The valve assembly of claim 7 wherein the axial extending main valve body has a valve body terminal end axially opposite the first reduced diameter first edge portion and a body bore that opens to the annular valve seat and to the valve body terminal end to at least in part, form part of the fluid passage, an annular valve member mounted in the valve body terminal end portion and having an annular valving surface opening toward the annular piston and in part defining the fluid passage, the body bore having a first bore portion and a second bore portion of a reduced diameter that opens to the first bore portion to form a body bore annular shoulder facing away from the valve stem intermediate the valve stem and the fluid outlet, the annular piston being mounted in the first bore portion for axial movement between an excess flow valve open position abutting against the body bore annular shoulder and an excess valve closed position axially spaced from the body bore annular shoulder and abutting against the annular valving surface to block fluid flow through the fluid passage, the excess flow valve including a spring urging the piston to the excess flow valve open position and the annular piston having an orifice adjacent to the annular valving surface to create a sufficient pressure drop to move the annular piston against the action of the spring to abut against the annular valving surface to block fluid flow through the fluid passage when there is excessive flow in the fluid passage.

9. A valve assembly mountable to a threaded neck portion of a vessel containing fluid under pressure, comprising:
   a housing having a housing portion threadable to the threaded neck portion;
   the housing portion having an inlet opening to a vessel interior when the housing is mounted to the threaded neck portion and an outlet, and a fluid passage fluidly connecting the inlet to the outlet, said fluid passage disposed in the housing;
   an axially elongated housing bore having a central axis and extending axially through the housing and opening to both the inlet and the outlet;
   a valve stem mounted to the housing and extending within the axially elongated housing bore, the valve stem having an enlarged diametric portion that has an enlarged diametric terminal edge disposed within the axially elongated housing bore;
   an operable main valve that forms at least part of the fluid passage and extending in the axially elongated housing bore for selectively blocking fluid flow through the fluid passage and permitting fluid flow through said fluid passage;
   a manually operated valve extending at least in part in said fluid passage between the operable main valve and the outlet for selectively blocking fluid flow through the fluid passage;
   and an excess flow valve extending in the fluid passage for automatically blocking fluid flow to the outlet in the event the rate of flow through to the outlet exceeds a preselected value;
   the excess flow valve being mounted by the operable main valve;
   and an actuator for selectively operating the operable main valve between a valve closed position and a valve open position.

10. The valve assembly of claim 9 wherein the operable main valve includes a valve stem extending within the axially elongated housing bore for axial movement between a valve open position and a valve closed position, the valve stem having an axial stem bore opening through the enlarged diametric terminal edge, an annular valve seat mounted in the enlarged diametric portion and an axially elongated main valve body extending within the axially elongated housing bore that includes a reduced diameter end portion extending within the annular valve seat in both the valve open position and the valve closed position, an axially opposite end portion axially opposite the reduced diameter end portion and a body bore opening to the annular valve seat adjacent to the reduced diameter end portion and to the axially opposite end portion, the valve stem, the annular valve seat and the axially elongated main body at least in part forming part of said fluid passage.

11. The valve assembly of claim 10 wherein the fluid passage includes a passage portion in the axially elongated main valve body fluidly connecting the body bore to the outlet, the excess flow valve includes a piston axially movable in the body bore between an excess flow valve closed position and an excess flow valve open position, said piston having a piston bore extending axially through the piston that forms part of the passage portion intermediate the reduced diameter end portion and the outlet, and a valve member extending within the body bore, the piston and valve member having cooperating surfaces for abutting against one another to block fluid flow through said passage portion when there is excessive flow in the passage portion.

12. The valve assembly of claim 10 wherein the body bore includes axial bore portions opening to one another to form an annular shoulder to limit the movement of the piston in an axial direction away from the valve member to an excess flow valve open position, the excess flow valve includes a spring acting between the valve member and the piston to resiliently urge the piston toward the annular shoulder and the piston includes a piston end portion adjacent to the valve member and having an orifice to provide a drop of fluid pressure to overcome the action of the spring and to draw the piston to an excess flow valve closed position when there is excessive flow through the piston.

13. The valve assembly of claim 12 further includes a manual shut off valve that includes a shut off valve stem and a shut off valve seat mounted by the shut off valve stem with the shut off valve stem being manually movable between a shut off valve open position and a shut off valve closed position that the shut off valve seat abuts against the piston end portion to block fluid flow through the passage portion.

14. The valve assembly of claim 12 wherein the annular valve seat has an inner peripheral cylindrical surface, the fluid passage is in part formed by the reduced diameter end portion having a radial outer annular groove that opens radially to the inner peripheral cylindrical surface and a cross bore opening to the body bore to provide the opening of the body bore to the annular valve seat.

15. A valve assembly mountable to a threaded neck portion of a vessel-containing fluid under pressure, comprising:
a housing having a housing portion threadable to the threaded neck portion and an axially elongated housing bore extending axially through the housing, the axially elongated housing bore having a first end portion and a second end portion;
the housing portion having an inlet opening to the axially elongated housing bore and to a vessel interior when the housing is mounted to the threaded neck portion and an outlet;
an axially extending main valve body bounded in the first end portion;
a valve stem mounted to the housing for axial movement between a valve open position and a valve closed position;
said valve stem extending within the second end portion and having an enlarged diameter portion that has an enlarged diametric terminal edge axially adjacent to the axially extending main body;
the enlarged diametric portion having an axial stem bore;
an annular valve seat mounted in the enlarged diametric portion and having an axial seat bore that has an inner peripheral surface;
the axially extending main valve body including a reduced diameter portion having an annular groove opening radially to the inner peripheral surface, an axial intermediate portion in fluid sealing relationship with the housing, a second cylindrical end portion axially opposite the reduced diameter portion, a valving portion extending between the axial intermediate portion and the reduced diameter portion to provide a cylindrical shoulder opening toward the annular valve seat and axially spaced from the annular valve seat and the enlarged diametric portion in the valve closed position to provide an annular fluid chamber and in the valve closed position being abuttable against the annular valve seat to block fluid flow from the annular fluid chamber to the annular groove and;
an axial body bore opening to the annular groove and to the outlet;
the valve stem having at least one annular shoulder opening axially opposite from said annular fluid chamber;
the axially elongated housing bore having a bore portion surrounding the enlarged diametric end portion to provide an annular clearance that in both the valve open position and the valve closed position has the inlet opening to the annular clearance, opens to the at least one annular shoulder and opens to said annular fluid chamber.

16. The valve assembly of claim 15 wherein an excess flow valve is mounted in the axial body bore for blocking fluid flow through the axial body bore to the outlet when the flow rate is above a desired rate, the axial body bore including a first bore portion and a second bore portion of a smaller diameter than the first bore portion and opening to the first bore portion to provide a second annular shoulder facing away from the reduced diameter portion, the excess flow valve including a piston mounted in the second bore portion for axial movement between an excess flow valve open position abutting against the second annular shoulder and an excess flow valve closed position axially spaced from the second annular shoulder, the piston having a piston bore extending axially through the piston, an annular valve member formed in the second bore portion to have the piston abut against the annular valve member in the excess flow valve closed position to block fluid flow from the piston bore to the outlet.

17. The valve assembly of claim 16 wherein the excess flow valve includes a spring acting against the annular valve member to resiliently retain the piston in abutting relationship to the second annular shoulder and the piston has a piston surface abuttable against the second annular shoulder, a valve seat for abutting against the annular valve member, a piston terminal end extendable into the valve member in the excess valve closed position, the piton terminal end providing an orifice that when excessive fluid flows through the orifice there is a pressure drop sufficiently great that the piston moves against the spring action to abut against the annular valve member.

18. The valve assembly of claim 17 wherein the axial body bore includes a third bore portion of a larger diameter than the body second bore portion to provide an annular clearance between the wall portion defining the axial body bore and the piston to provide at least in part the opening of the axial body bore to the outlet and that opens to the piston bore in the excess flow valve open position.

* * * * *

UNITED STATES PATENT AND TRADEMARK OFFICE
CERTIFICATE OF CORRECTION

PATENT NO. : 7,441,564 B2
APPLICATION NO. : 11/146373
DATED : October 28, 2008
INVENTOR(S) : Todd W. Larsen et al.

It is certified that error appears in the above-identified patent and that said Letters Patent is hereby corrected as shown below:

On the Title Page:

At Item (73), "ELk" should be -- Elk --.

In the Specification:

At Column 1, line 59, "value" should be -- valve --.

At Column 2, line 55, "motor" should be -- minor --.

At Column 5, line 9, "shoulder-81" should be -- shoulder 81 --.

At Column 5, line 36, "79—and" should be -- 79 and --.

At Column 6, line 23, "against radial" should be -- against the radial --.

At Column 6, line 61, "other for" should be -- other than --.

At Column 7, line 4, "117," should be -- 117 --.

At Column 7, line 5, "are" should be -- is --.

At Column 7, line 42, "117" should be -- 117, --.

At Column 7, line 44, "is" should be -- are --.

In the Claims:

At Column 12, line 1 claim 15, "bounded" should be -- mounted --.

Signed and Sealed this

Twelfth Day of May, 2009

JOHN DOLL
*Acting Director of the United States Patent and Trademark Office*